(12) United States Patent
Guo et al.

(10) Patent No.: US 8,871,300 B2
(45) Date of Patent: Oct. 28, 2014

(54) METHOD FOR MAKING CARBON NANOTUBE BASED COMPOSITE

(75) Inventors: Jian-Wei Guo, Beijing (CN); Li-Na Zhang, Beijing (CN); Li Wang, Beijing (CN); Cheng Wang, Beijing (CN); Xiang-Ming He, Beijing (CN); Zhi-Xiang Liu, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 720 days.

(21) Appl. No.: 13/053,652

(22) Filed: Mar. 22, 2011

(65) Prior Publication Data

US 2012/0149547 A1 Jun. 14, 2012

(30) Foreign Application Priority Data

Dec. 8, 2010 (CN) .......................... 2010 1 0579196

(51) Int. Cl.
| | |
|---|---|
| *B05D 7/00* | (2006.01) |
| *B82Y 40/00* | (2011.01) |
| *B82Y 30/00* | (2011.01) |
| *H01M 4/96* | (2006.01) |
| *H01M 4/86* | (2006.01) |

(52) U.S. Cl.
CPC *H01M 4/96* (2013.01); *Y02E 60/50* (2013.01); *B82Y 30/00* (2013.01); *H01M 4/8668* (2013.01); *Y10S 977/847* (2013.01); *Y10S 977/742* (2013.01)
USPC .............................. 427/215; 977/847; 977/742

(58) Field of Classification Search
USPC .......... 427/215, 216, 212, 122; 977/742, 843, 977/847; 502/159
See application file for complete search history.

(56) References Cited

U.S. PATENT DOCUMENTS

2012/0027934 A1 2/2012 Lee et al.

FOREIGN PATENT DOCUMENTS

| CN | 1674330 | * 9/2005 |
|---|---|---|
| WO | WO2010090480 | 8/2010 |

OTHER PUBLICATIONS

Gou et al., "Preparation and the Physical/Electrochemical Properties of a Pt/C nanocatalyst Stabilized by Citric Acid for Polymer Electrolyte Fuel Cells", Science Direct, Electrochimical Acta 50, 2005, pp. 1973-1983.*
Wang et al., "Templated Synthesis of Single-Walled Carbon Nanotube and Metal Nanoparticle Assemblies in Solution", American Chemical Society, 2006, pp. 15078-15079.*
Turkevich et al. "Further Studies on the Synthesis of Finely Divided Platinum", Journal of Phys. Chemistry, vol. 90, 1986, pp. 4765-4767.*

* cited by examiner

*Primary Examiner* — Timothy Meeks
*Assistant Examiner* — Ann Disarro
(74) *Attorney, Agent, or Firm* — Novak Druce Connolly Bove + Quigg LLP

(57) ABSTRACT

A method for making a carbon nanotube based composite is provided. In the method, carriers, solution containing metal ions, and a carboxylic acid solution are mixed to form a mixed solution containing a complex compound. A reducing agent is added into the mixed solution. The metal ions are reduced to metal particles absorbed on the surface of the carriers. The carriers having the metal particles absorbed thereon are purified to obtain the carbon nanotube based composite.

17 Claims, 5 Drawing Sheets

METHOD FOR MAKING CARBON NANOTUBE BASED COMPOSITE

CROSS-REFERENCE TO RELATED APPLICATIONS

This application claims all benefits accruing under 35 U.S.C. §119 from China Patent Application No. 201010579196.6, filed on Dec. 8, 2010, in the China Intellectual Property Office, the contents of which are hereby incorporated by reference.

BACKGROUND

1. Technical Field

The present disclosure relates to a method for making a carbon nanotube based composite.

2. Description of Related Art

Carbon nanotube composited with metal particles is becoming a hot research subject. Carbon nanotube is an ideal metal particle catalyst carrier for the large surface area and high electric conductivity. The composite having the carbon nanotubes composited with the metal catalyst has shown great promise of use in fields of electrochemical cell, fuel cell, and biomedicine.

When using the composite as a catalyst, the uniformity and amount of the metal particles loaded and dispersed on the surface of the carbon nanotubes directly influence catalytic performance of the composite. Typically, the catalytic performance of the composite increases with the amount of metal particles that are loaded. However, metal particles easily aggregate when the amount of the metal particles loaded increases.

The composite is commonly fabricated by physical methods or chemical methods. Metal particles are sputtered on the surface of the carbon nanotubes by physical methods. Chemical methods include colloid method, solution reduction method, immersion method, electrochemical deposition method, or supercritical fluid method. However, it is difficult to have a balance between the loading amount and the dispersing uniformity of the metal particles on the surface of the carbon nanotubes with the methods mentioned above.

What is needed, therefore, is to provide a method for making a carbon nanotube based composite having a relatively high loading amount of the metal particles which meanwhile having the metal particles well dispersed.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

Figure 1:
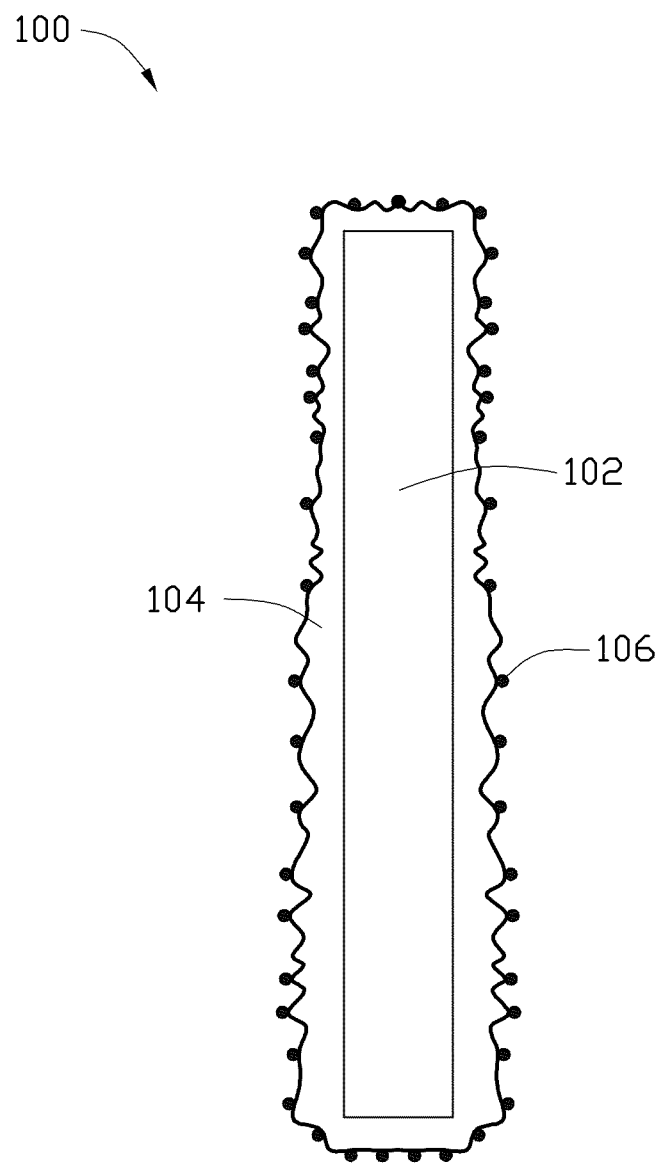
FIG. 1 is a schematic view of an embodiment of a carbon nanotube based composite.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

One embodiment of a method for making a carbon nanotube based composite, having carbon nanotubes composited with metal particles, includes the following steps:

S1, providing carriers, each carrier including a carbon nanotube and a polymer layer coated on a surface of the carbon nanotube;

S2, mixing the carriers, a solution containing metal ions, and a first amount of carboxylic acid solution to form a mixed solution containing a complex compound;

S3, adding a reducing agent into the mixed solution to reduce the metal ions to metal particles absorbed on the surface of the carriers; and S4, purifying the mixed solution with the reducing agent added to obtain the carriers having the metal particles absorbed thereon.

In step S1, a material of the polymer layer is polymer. The polymer can be a hydrophilic polymer. In one embodiment, the hydrophilic polymer may have amine groups. The carbon nanotubes coated with the polymer layer can have an improved dispersion in water. The carriers can be fabricated by a method of in-situ synthesis, surface chemical modification, or chemical grafting. In one embodiment, the polymer layer is synthesized in-situ on the surface of the carbon nanotubes. The in-situ synthesis method can include the following steps:

S11, providing the carbon nanotubes and polymer monomers;

S12, mixing the carbon nanotubes and the polymer monomers in water to form a mixture;

S13, adding an initiator into the mixture to induce a polymerization of the polymer monomers, and form the polymer layer coated on the surface of the carbon nanotubes; and S14, purifying the mixture with the initiator added to obtain the carbon nanotubes with the coated polymer layer.

In step S11, the carbon nanotubes can be single-walled carbon nanotubes (SWCNTs), double-walled carbon nanotubes (DWCNTs), multi-walled carbon nanotubes (MWCNTs), or any combination thereof. The carbon nanotubes can be fabricated by a method of arc discharge, chemical vapor deposition (CVD), or laser evaporation. In one embodiment, the MWCNTs fabricated by the CVD method are used. An inner diameter of the MWCNTs can be in a range from about 10 nanometers to about 50 nanometers. An outer diameter of the MWCNTs can be in a range from about 30 nanometers to about 80 nanometers. A length of the MWCNTs can be in a range from about 50 microns to about 100 microns.

The polymer monomers can be aniline, pyrrole, thiophene, amide, propylene imine, or derivates thereof. The derivate, for example, can be acetanilide, methylpyrrole, ethylenedioxythiophene, oxamide or caprolactam. The polymer monomers can be other substances that are capable of having a polymerization to form a polymer on single or plural of carbon nanotubes. A mass ratio of the carbon nanotubes to the polymer monomers can be in a range from about 1:1 to about 1:10. In one embodiment, the polymer monomers are aniline.

In step S12, the carbon nanotubes and the polymer monomers can be added at the same time or one by one in water. In one embodiment, the carbon nanotubes are added in water first and are ultrasonically vibrated for a set time, then the polymer monomers are added in water, and the mixture continues to be ultrasonically vibrated.

The step S12 can further include a step of functionalizing the carbon nanotubes by adding a second amount of carboxylic acid solution into the mixture. In one embodiment, a carboxylic acid in the second amount of carboxylic acid solution includes at least two carboxyl groups. One or some of the carboxyl groups are used to surface functionalize the carbon nanotubes, thereby increasing the dispersion ability of the carbon nanotubes in water. The spare carboxyl groups that do not react with the carbon nanotubes are electrostatically attracted to the polymer monomers. Thus, an improved polymer coating of the carbon nanotubes can be achieved. The carboxylic acid in the second amount of the carboxylic acid solution can be citric acid ($C_6H_8O_7$), oxalic acid ($C_2H_2O_4$), malonic acid ($C_3H_4O_4$), butane diacid ($C_4H_6O_4$), adipic acid ($C_6H_6O_4$), terephthalic acid ($C_8H_8O_4$), glutaric acid ($C_5H_8O_4$), or any combination thereof. In one embodiment, the carboxylic acid in the second amount of the carboxylic acid solution is $C_6H_8O_7$. A molar ratio of the carboxylic acid in the second amount of the carboxylic acid solution to the polymer monomers can be in a range from about 1:1 to about 10:1. In one embodiment, the mixing step of S12 includes the sub-steps of:

S121, adding the carbon nanotubes into a container containing water;

S122, adding the second amount of carboxylic acid water solution into the water;

S123, ultrasonically vibrating a mixture of the carbon nanotubes, the second amount of carboxylic acid water solution, and the water for about 1 hour to about 4 hours; and S124, adding the polymer monomers in the container to form the mixture.

In step S13, the initiator is used to induce the polymer monomers polymerize to produce the polymer. The initiator can be at least one of ammonium persulfate (($NH_4)_2S_2O_8$), potassium persulfate ($K_2S_2O_8$), sulfuric acid ($H_2SO_4$), nitric acid ($HNO_3$), and potassium iodate ($KIO_3$). A molar ratio of the initiator to the polymer monomers is greater than 1:1, such that the polymer monomers can be thoroughly polymerized on the surface of the carbon nanotubes. In one embodiment, the polymer monomer is aniline, the initiator is ($NH_4)_2S_2O_8$. The polymer may be individually coated on the single carbon nanotube, and each of the carbon nanotubes may have a polymer layer coated thereon. In one embodiment, the mass ratio of the MWCNTs to the aniline is about 1:2; a molar ratio of the ($NH_4)_2S_2O_8$ to the aniline is about 2:1.

The step S13 can further include a step of stirring the mixture to make the polymer monomers be thoroughly polymerized. In one embodiment, the step of stirring lasts from the beginning of adding the initiator into the mixture to the end of the polymerization. A polymerization temperature and time period relate to the kinds of polymer monomers and the initiator. In one embodiment, the polymerization temperature can be in a range from about 0° C. to about 60° C. The time period for the polymerization can be in a range from about 10 hours to about 20 hours. In one embodiment, the polymer monomers are polymerized in an ice bath (the temperature is in a range from about 0° C. to about 5° C.) for about 12 hours.

In step S14, the polymer coated carbon nanotubes can be obtained by a filtering step and washing step by water for several times.

In step S2, the metal ions in the solution can be precious metal ions or some metal ions having a good catalytic performance. The precious metal ions can be at least one of gold ions ($Au^{3+}$), silver ions ($Ag^+$), platinum ions ($Pt^{4+}$), rhodium ions ($Rh^{3+}$), iridium ions ($Ir^{4+}$). The metal ions having a good catalytic performance can be at least one of copper ions ($Cu^{2+}$), ferrous ions ($Fe^{2+}$), cobalt ions ($Co^{2+}$), and nickel ions ($Ni^{2+}$). Accordingly, the solution containing metal ions can be a solution of chloroauric acid ($HAuCl_4$), gold chloride ($AuCl_3$), silver nitrate ($AgNO_3$), chloroplatinic acid ($H_2PtCl_6$), ruthenium chloride ($RuCl_3$), Chlororhodic acid ($H_3RhCl_6$), palladium chloride ($PdCl_2$), hexachloroosmic acid ($H_2OsCl_6$), hexachloroiridic acid ($H_2IrCl_6$), copper sulfate ($CuSO_4$), ferrous chloride ($FeCl_2$), or any combination thereof. In one embodiment, the solution containing metal ions is $HAuCl_4$ water solution.

The carboxylic acid in the first amount of carboxylic acid solution includes at least two carboxyl groups, and can be $C_6H_8O_7$, $C_2H_2O_4$, $C_3H_4O_4$, $C_4H_6O_4$, $C_6H_6O_4$, $C_8H_8O_4$, $C_5H_8O_4$, or any combination thereof. In one embodiment, a molar ratio of the carboxylic acid in the first amount of carboxylic acid solution to the metal ions can be in a range from about 1:1 to about 10:1. In one embodiment, $C_6H_8O_7$ is used as the carboxylic acid in the first amount of carboxylic acid solution.

In step S2, the carriers, the solution containing metal ions and the first amount of carboxylic acid solution can be mixed at the same time or one by one. A weak complex reaction occurs between the metal ions and the carboxylic acid in the first amount of carboxylic acid solution, wherein the carboxylic acid in the first amount of carboxylic acid solution acts as a weak reducing agent. The metal ions after the complex reaction exist as complex ions. The carboxylic acid in the first amount of carboxylic acid solution also acts as a stabilizer, which has a stability greater than reducing of the carboxylic acid in the first amount of carboxylic acid solution. By using the stability of the carboxylic acid in the first amount of carboxylic acid solution, a diameter of the metal particles formed in step S3 can be well controlled, and the metal particles can be evenly distributed on the surface of the carrier. Therefore, an aggregation of the metal particles formed on the surface of the carriers can be well suppressed. Besides, the spare carboxyl groups of the carboxylic acid in the first amount of carboxylic acid solution are electrostatically attracted or chemically bonded with the polymer. In one embodiment, the carboxylic acid in the first amount of carboxylic acid solution of step S2 is $C_6H_8O_7$, and the polymer is polyaniline (PANI). The carboxyl group of the $C_6H_8O_7$ is chemical bonded with the amino group of the PANI as a form of —COONH—, or electrostatic attracted the amino group of the PANI. Additionally, the carboxyl group of $C_6H_8O_7$ weakly complex reacts with $HAuCl_4$. After the complex reaction, the gold ions exist as complex ions, such as $[AuCl_3COO]^-$.

A mass ratio of the carriers to the solution containing metal ions can be in a range from about 2.3:1 to about 0.4:1. In one embodiment, the mixing step of S2 includes the steps of: adding the carriers to the first amount of carboxylic acid solution, and then adding the solution containing metal ions to the first amount of carboxylic acid solution.

The step S2 can further include a stirring step to evenly mix the carriers, the solution containing metal ions, and the first amount of carboxylic acid solution, and to have the weak complex reaction be completely reacted. In one embodiment, the mixed solution is ultrasonically vibrated for about half an hour to about 24 hours. A temperature of the complex reaction can be in a range from about 0° C. to about 100° C. In the range from about 0° C. to about 100° C., loading amount of the metal particles on the surface of the carriers increases with the rising of the temperature of the complex reaction. In one embodiment, the temperature of the complex reaction is about 25° C.

The step S2 can further include a step of adjusting a pH value of the mixed solution in a range from about 2 to about 8. The formed metal particles can be evenly distributed on the surface of the carriers within the pH value range. In one embodiment, the pH value of the mixed solution is adjusted to 3.3 at the beginning of the complex reaction, and is kept up until the reaction ends.

In step S3, the reducing agent can reduce the metal ions to the metal particles. The reducing agent can be at least one of sodium borohydride ($NaBH_4$), formaldehyde ($CH_2O$), hydrogen peroxide ($H_2O_2$), $C_6H_8O_7$, hydrogen ($H_2$), and ascorbic acid. In one embodiment, the reducing agent is the $NaBH_4$ solution. A molar ratio of the reducing agent to the metal ions can be in a range from about 10:1 to about 60:1. In one embodiment, a molar ratio of $NaBH_4$ to $HAuCl_4$ is about 50:1.

In step S3, the formed metal particles are absorbed to the surface of the polymer layer of the carriers. The carboxyl group of the carboxylic acid in the first amount of carboxylic acid solution added in step S2 acts as a bridge between the metal particle and the polymer. The carboxyl group not only electrostatically attracts or chemically bonds to the polymer but also strongly absorbs the metal particle. Thus, the metal particles can be steadily distributed on the surface of the carrier.

In step S4, the carriers having the metal particles absorbed thereon can be obtained by a filtering step and a washing step by water several times. The carbon nanotube based composite thus is achieved.

Referring to FIG. 1, the carbon nanotube based composite 100 fabricated by the method mentioned above includes the carbon nanotube 102, the polymer layer 104 coated on the surface of the carbon nanotube 102, and metal particles 106 absorbed on the surface of the polymer layer 104. The metal particles 106 are evenly distributed on the surface of the polymer layer 104. A diameter of each of the metal particles 106 is in a range from about 1 nanometer to about 10 nanometers. A mass ratio of the metal particles 106 to the carbon nanotube based composite 100 can be in a range from about 20% to about 60%. In one embodiment, the carbon nanotube based composite 100 is Au/PANI/MWCNT composite, and the metal particles 106 have a diameter in a range from about 1 nanometer to about 5 nanometers and comprise of gold.

EXAMPLES

The Au/PANI/MWCNT composites with different loading amount of the gold particles are synthesized in the following examples:

Example 1

(1) Synthesis of the Carriers (PANI/MWCNT Composite)

MWCNTs synthesized by CVD method and $C_6H_8O_7$ are added in 300 ml of water to form a mixture, and the mixture is ultrasonically vibrated for 2 hours. The purified aniline is added to the ultrasonically vibrated mixture. The $(NH_4)_2S_2O_8$ water solution is then added to the mixture having the aniline, and then the mixture is stirred for about 12 hours to make the aniline polymerize in an ice bath condition. The carriers of the PANI/MWCNT composite are obtained, and are purified by filtering and washing. A mass ratio of the MWCNTs to the aniline is about 1:2. A molar ratio among $(NH_4)_2S_2O_8$, aniline, and $C_6H_8O_7$ is about 2:1:2.

(2) Synthesis of the Au/PANI/MWCNT Composite

Figure 2:
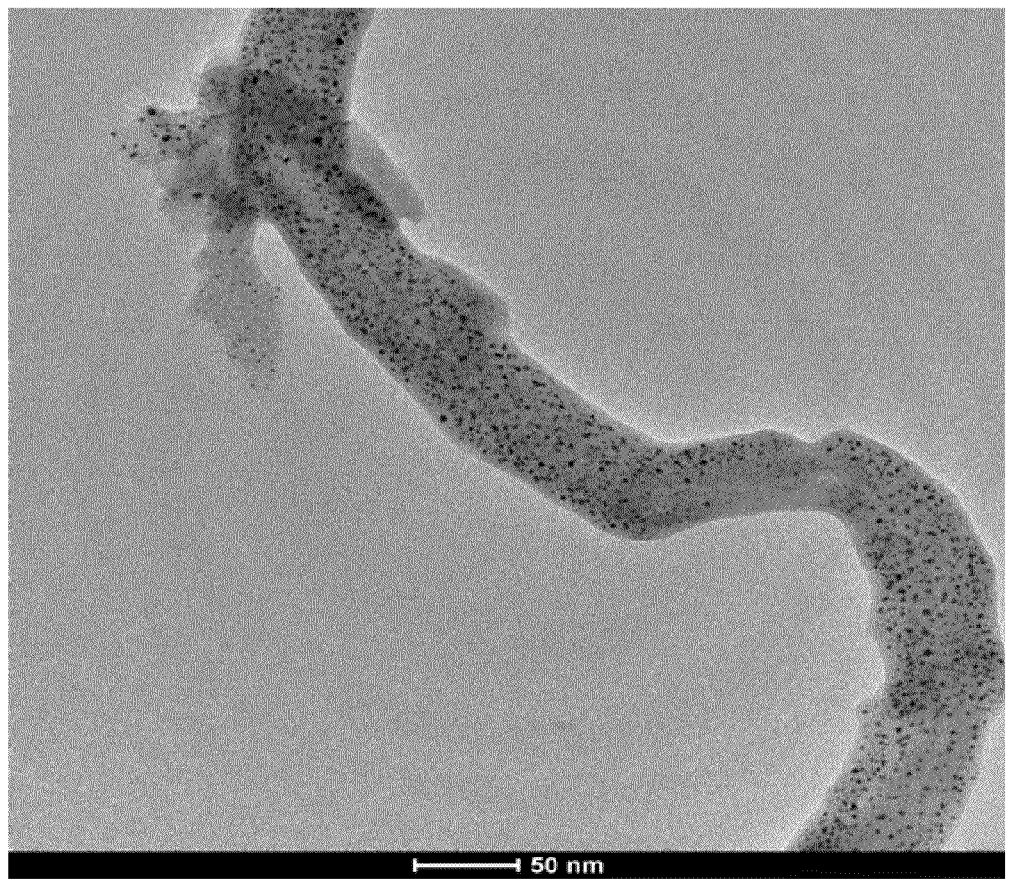
FIG. 2 shows a Transmission Electron Microscope (TEM) image of the carbon nanotube based composite of Example 1.

PANI/MWCNT composite is added to the $C_6H_8O_7$ water solution. $HAuCl_4$ water solution is then added to complex react with the $C_6H_8O_7$ water solution. The mixture of the $HAuCl_4$ water solution and the $C_6H_8O_7$ water solution is ultrasonically vibrated for 0.5 hours. The molar ratio of $C_6H_8O_7$ to $HAuCl_4$ is about 1:1. After about 8 hours, $NaBH_4$ water solution is added to the reacted solution to reduce the gold ions to gold particles absorbed on the surface of the carriers. The Au/PANI/MWCNT composite thus is achieved after being filtered and washed. A mass ratio of the carriers of PANI/MWCNTs composites to the $HAuCl_4$ is about 2.2:1. A molar ratio of $NaBH_4$ to $HAuCl_4$ is about 50:1. A diameter of the gold particles is in a range from about 2 nanometers to about 5 nanometers. A mass ratio of the gold particles in the Au/PANI/MWCNT composite is about 40%. Referring to FIG. 2, there are no gold particles conglomerating, and the gold particles are evenly distributed on the surface of the PANI/MWCNT composite.

Comparative Example 1

The Au/PANI/MWCNT composite is synthesized by the same method as in Example 1, except that $C_6H_8O_7$ is not used during the process of using the PANI/MWCNT composite to fabricate the Au/PANI/MWCNT composite.

Figure 3:
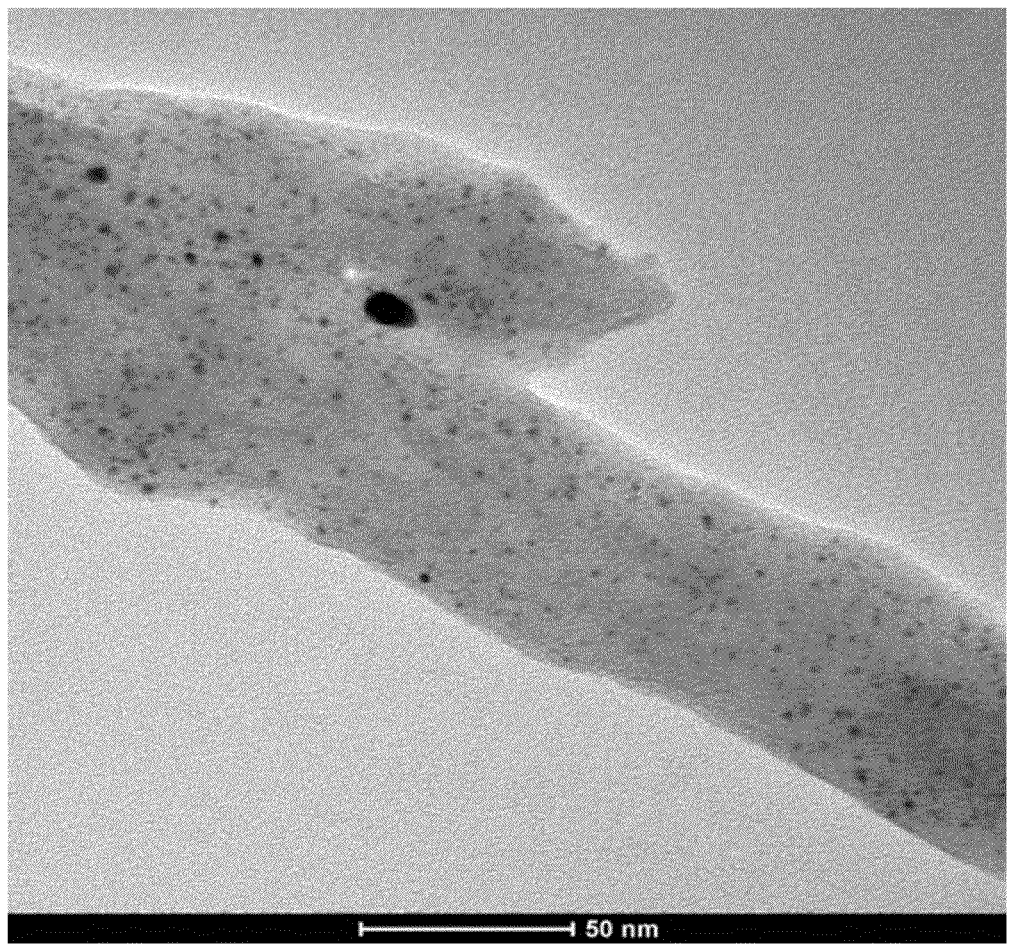
FIG. 3 shows a comparing TEM image of the carbon nanotube particle based composite of Comparative Example 1.

Referring to FIG. 3, some of the gold particles are aggregated. The comparing result indicates that an addition of the $C_6H_8O_7$ is good for suppressing the aggregation of the gold particles.

Example 2

The Au/PANI/MWCNT composite is synthesized by the same method as in Example 1, except that the mass ratio of the carriers to the $HAuCl_4$ is about 0.33:1. The mass ratio of the gold particles in the Au/PANI/MWCNT composite is about 60%. TEM image of Au/PANI/MWCNT composite is shown in FIG. 4.

Comparative Example 2

The Au/PANI/MWCNT composite is synthesized by the same method as in Example 2, except that $C_6H_8O_7$ is not used during the process of using the PANI/MWCNT composite to fabricate the Au/PANI/MWCNT composite. TEM image of the Au/PANI/MWCNT composite is shown in FIG. 5.

Figure 4:
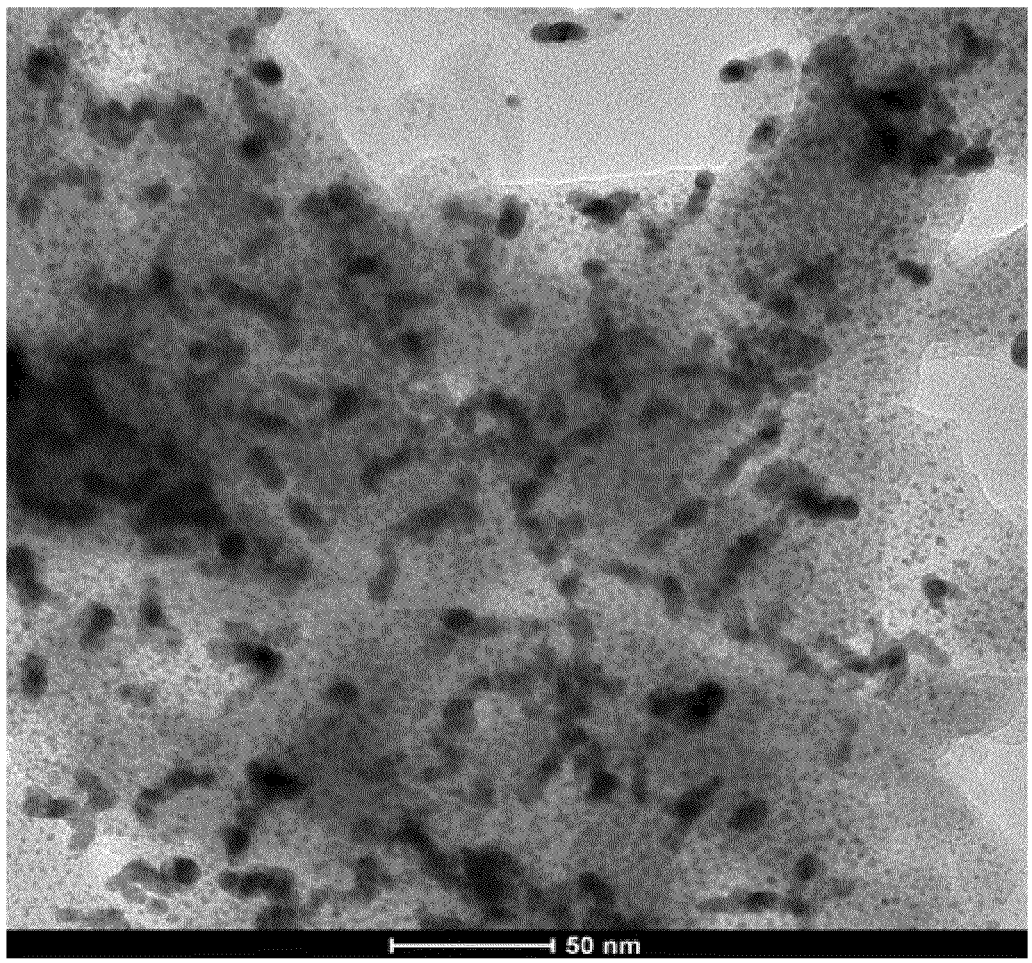
FIG. 4 shows a TEM image of the carbon nanotube based composite of Example 2.
Figure 5:
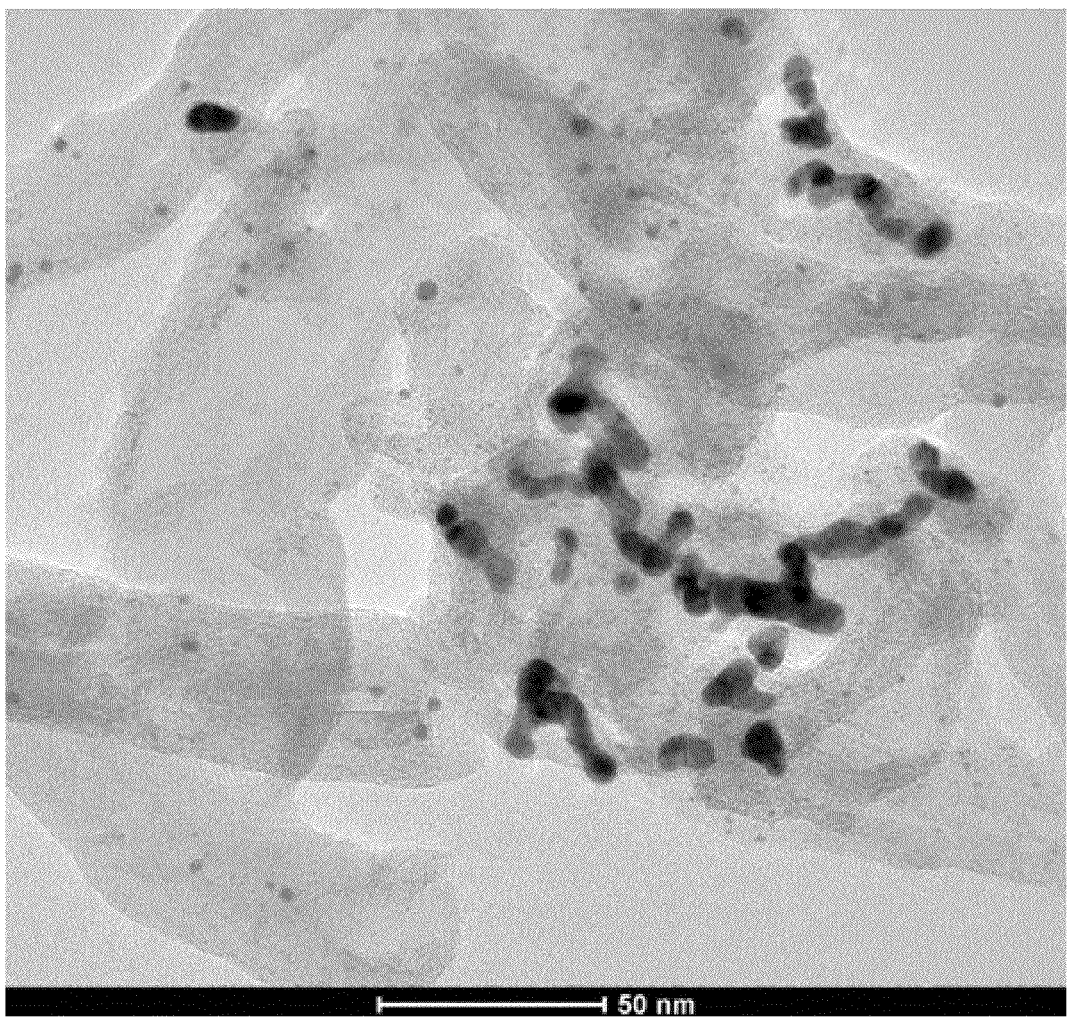
FIG. 5 shows a comparing TEM image of the carbon nanotube based composite of Comparative Example 2.

Referring to FIG. 4 and FIG. 5, with an increase of the loading amount of the gold ions, the diameter of the synthesized gold particles is increased. A large amount of the gold particles are absorbed on the surface of the PANI/MWCNT composite carrier. The loading amount of the gold particles is increased obviously and the gold particles are evenly distributed on the surface of the PANI/MWCNT composites in FIG. 4 compared with FIG. 5. Referring to FIG. 5, the loading amount of the gold particles is relatively low, and the gold particles are unevenly distributed on the surface of the PANI/MWCNT composites. The comparing result indicates that the addition of $C_6H_8O_7$ not only can increase the practical loading amount of the gold particles on the surface of the PANI/MWCNT composites, but also can effectively adjust the gold particles evenly distributed on the surface of the PANI/MWCNT composite.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a carbon nanotube based composite, the method comprising:
   providing a plurality of carriers, each carrier comprises a carbon nanotube and a polymer layer coated on a surface of the carbon nanotube;
   mixing the plurality of carriers, a solution containing metal ions, and a first amount of carboxylic acid solution to form a mixed solution containing a complex compound;
   adjusting a pH value of the mixed solution so that the pH value is in a range from about 2 to about 8;
   adding a reducing agent to the mixed solution to reduce the metal ions to metal particles absorbed on the surface of the plurality of carriers, and
   purifying the mixed solution with the reducing agent added to obtain the plurality of carriers having the metal particles absorbed thereon.

2. The method of claim 1, wherein the metal ions comprise at least one of gold ions, silver ions, platinum ions, rhodium ions, iridium ions, copper ions, ferrous ions, cobalt ions, and nickel ions.

3. The method of claim 1, wherein the solution, containing the metal ions, is selected from the group consisting of chlorolauric acid, gold chloride, silver nitrate, chloroplatinic acid, ruthenium chloride, chlororhodic acid, palladium chloride, hexachloroosmic acid, hexachloroiridic acid, copper sulfate, and ferrous chloride.

4. The method of claim 1, wherein a carboxylic acid in the first amount of carboxylic acid solution comprises at least two carboxyl groups.

5. The method of claim 4, wherein the carboxylic acid is at least one of citric acid, oxalic acid, malonic acid, butane diacid, adipic acid, terephthalic acid, and glutaric acid.

6. The method of claim 1, wherein the reducing agent is at least one selected from the group consisting of sodium borohydride, formaldehyde, hydrogen peroxide, citric acid, hydrogen, and ascorbic acid.

7. The method of claim 1, wherein a molar ratio of the reducing agent to the metal ions is in a range from about 10:1 to about 60:1.

8. The method of claim 1, wherein the step of mixing the plurality of carriers, the solution containing the metal ions, and the first amount of carboxylic acid solution comprises:
   putting the plurality of carriers into the first amount of carboxylic acid solution, and
   adding the solution containing the metal ions to the first amount of carboxylic acid solution.

9. The method of claim 1, wherein the mixing is performed by ultrasonically vibrating the mixed solution for about 0.5 hours to about 24 hours.

10. The method of the claim 1 further comprising maintaining a temperature of the mixed solution in a range from about 0° C. to about 100° C.

11. The method of the claim 1, wherein a molar ratio of the metal ions to a carboxylic acid in the first amount of carboxylic acid solution is in a range from about 1:1 to about 1:10.

12. The method of the claim 1, wherein a mass ratio of the plurality of carriers to the solution containing the metal ions is in a range from about 2.3:1 to about 0.4:1.

13. The method of claim 1, wherein the pH value of the mixed solution is adjusted to 3.3.

14. The method of the claim 1, wherein the plurality of carriers are prepared by steps of:
   providing the carbon nanotubes and polymer monomers;
   mixing the carbon nanotubes and the polymer monomers in water to form a mixture;
   adding an initiator into the mixture to induce a polymerization of the polymer monomers, and form the polymer layer coated on the surface of the carbon nanotubes, and
   purifying the mixture with the initiator added to obtain the carbon nanotubes with the polymer layer coated on the carbon nanotubes.

15. The method of the claim 14, wherein the polymer monomers are selected from the group consisting of aniline, pyrrole, thiophene, amide, propylene imine, acetanilide, methylpyrrole, ethylenedioxythiophene, oxamide, and caprolactam.

16. The method of the claim 14 further comprising a step of adding a second amount of carboxylic acid solution into the mixture.

17. The method of the claim 16, wherein the carboxylic acid in the second amount of carboxylic acid solution is selected from the group consisting of citric acid, oxalic acid, malonic acid, butane diacid, adipic acid, terephthalic acid, and glutaric acid.

* * * * *